Jan. 18, 1938.  E. NIELSEN ET AL  2,106,058
ELECTRIC MOTOR
Filed Dec. 19, 1936  2 Sheets-Sheet 1
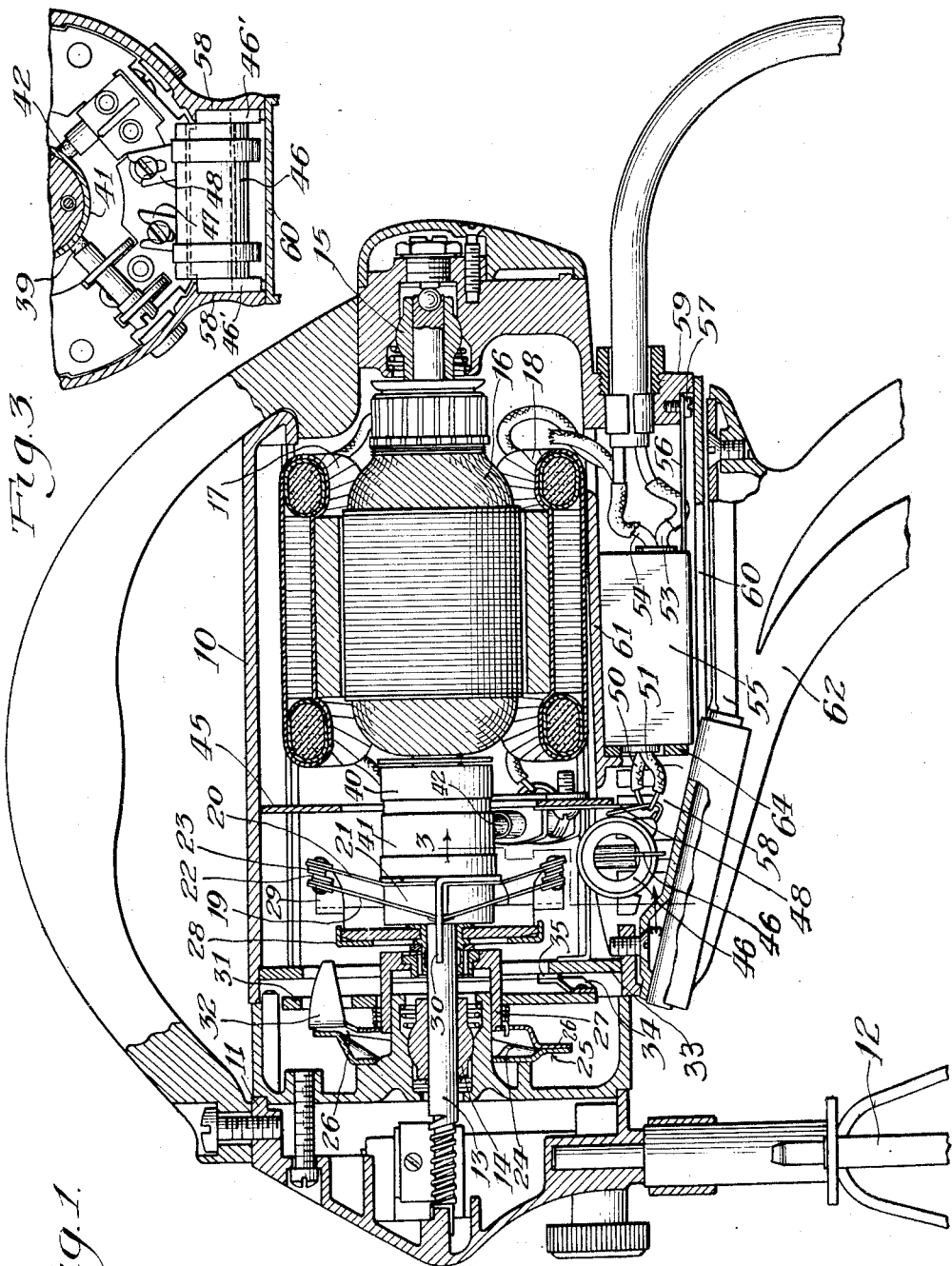
Inventors:
Emanuel Nielsen,
Victor A. Partz,
By: Bertha L. MacGregor
Attorney.

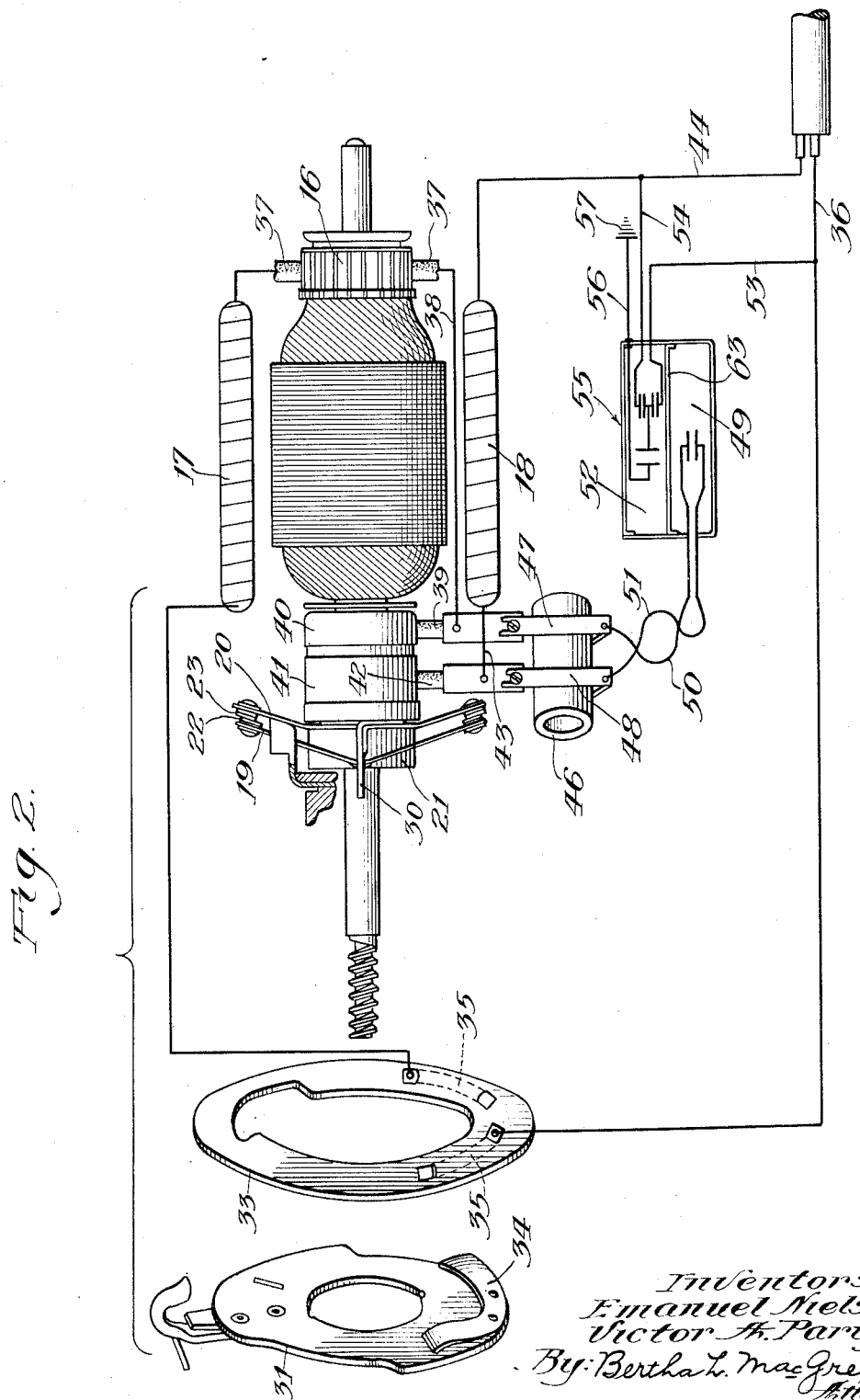

Patented Jan. 18, 1938

2,106,058

UNITED STATES PATENT OFFICE 2,106,058

ELECTRIC MOTOR

Emanuel Nielsen and Victor A. Partz, Racine, Wis., assignors to Scovill Manufacturing Company, Waterbury, Conn., a corporation of Connecticut Application December 19, 1936, Serial No. 116,767

19 Claims. (Cl. 171—252)

This invention relates to electric motors and particularly to motors adapted for embodiment in motor driven food mixers, juice extractors and the like.

The invention is especially adapted for motors provided with speed controlling means including contact points for intermittently making and breaking the electric circuit, and one of the objects of the invention is to provide arc-suppressing condensers which efficiently prevent deterioration of the contact points.

Another object is to provide means for preventing radio interference by the operation of the motor.

Another object is to provide means for housing arc-suppressing and radio filter condensers, whereby said condensers may be placed very close to the source of interference and their efficiency be enhanced.

Another object is to provide a single container for the arc-suppressing and radio filter condensers, in which the condensers are shielded to prevent coupling or the building up of an induced field from one to the other condenser.

Another object is to provide means for protecting the condensers from heat, particularly that generated by the resistor coil, whereby the efficiency of the condensers is increased.

Another object is to provide condenser discharge means, active in function and free of parts which tend to retard or choke the discharge.

Further objects and advantages will appear from the following specification.

The invention, as herein shown and described, is embodied in a motor adapted for operating a food mixer, but its use is not limited thereto.

In the drawings:

Fig. 1 is a longitudinal, vertical sectional view of a motor embodying our invention, the same being provided with gearing adapted for operating a food mixer.

Fig. 2 is a schematic view showing the electrical wiring and those parts of the mechanism which are connected in the motor circuit.

Fig. 3 is a transverse vertical section taken on line 3—3 of Fig. 1.

In that embodiment of our invention shown in the drawings, the motor casing 10 has rigidly connected to one end a gear casing 11 which contains gearing for operating the agitators 12 of a food mixer. The armature shaft 13 is journalled in lubricated bearings 14, 15, in the casing 10 and extends into the gear casing 11. The armature is indicated at 16 and the field coils at 17 and 18.

While the present invention may be applied with advantage to motors provided with various kinds of speed controls, we have shown herein our preferred embodiment in which automatically operated speed control mechanism is located between the armature and the casing wall adjacent the gearing chamber.

The speed control mechanism, per se, has been shown, described and claimed in the co-pending application of Emanuel Nielsen, Serial No. 96,214, filed August 15, 1936. It comprises spring metal arms 19 and 20 mounted between their ends on the shaft 13 and insulated from each other at 21. The arms extend radially in opposite directions from the shaft and carry on their proximate faces, at each end, contact points 22, 23. The arm 19 is bent so that its ends are inclined toward the arm 20 and normally bear against said arm, with the points 22 and 23 in contact, but under the influence of centrifugal force the arm 19 tends to straighten and the contact points separate. For the purposes of the present application the details of construction of the speed controlling mechanism need not be described at length, but it should be understood that said mechanism includes means for adjusting the position of the spring arm 20 whereby the tendency of the contacts 22 and 23 to separate under the influence of centrifugal force is varied. Said adjusting means comprises the circumferentially inclined surfaces 24 formed on the face of the disc 25 at the end of the motor casing, a disc 26 on a hub 27 movable longitudinally of the shaft 13, said disc 26 having inclined surfaces bearing on said surfaces 24, and a rotated member 28 having ears 29 bearing on the spring arm 20. The member 28 is loosely mounted on the shaft 13 so as to be longitudinally movable on the shaft but it is rotated with the shaft by means of a pair of ears 30 fixed to the shaft and engaging said member 28.

The disc 26 may be rotated and caused to move axially of the shaft 13 by means of the manually operated indicator disc 31 engaging the ear 32 of said disc 26, whereby said parts 26, 27, 28, and 29 are moved toward or from the spring arm 20. The indicator disc 31 and an adjacent fixed ring 33 carry contact members 34 and 35, respectively, which serve as a switch in the motor circuit.

Current enters the line at 36, and passes through the switch contacts 34, 35, when closed, to field coil 17, brush 37 to armature 16, brush 37 to line 38, to brush 39 and collector ring 40 electrically connected with the contacts 22, 22 on arm 19, then to contacts 23, 23, on arm 20, to collector ring 41, brush 42, line 43, field coil 18 and line 44.

The brushes 39 and 42 are mounted in brush holders secured to a support 45 fixedly mounted in the casing 10. A resistor and an arc-suppressing condensor to protect the contact points 22, 23 are shunted across the collector rings 40, 41, the resistor 46 being provided with conductor arms 47, 48 electrically connected with the holders for the brushes 39 and 42, respectively. The condenser 49 is connected with said arms 47, 48 by crossed wires 50, 51. Twisting of the wires 50, 51 reduces inductance between the contact points and condenser.

A radio interference filter 52 is connected across the lines 36 and 44 by wires 53, 54. The filter container 55 is grounded by means of a discharge wire 56 connected directly to the casing 10 by a brass screw 57.

The operator adjusts the indicator disc 31 to a position indicating desired speed. This adjustment alters the axial positions of parts 26, 27, and 28, and varies the pressure of the ears 29 bearing on the ends of the arm 20. The contacts 23, 23 are pressed toward the armature to a greater degree when the motor is running at slow speed than at high, thus allowing centrifugal force to throw the contacts 22, 22 away from contacts 23, 23 more easily, thereby breaking the circuit. As the parts 26, 27, and 28 are moved toward the gear casing end of the motor, and pressure of the ears 29 on the arm 20 is decreased, the motor speed increases, due to the higher speed required to cause the contacts 22 to separate from contacts 23. When the contacts are closed the motor is connected directly to the line, and when they are open the motor is disconnected from the line, with the exception of the small current which flows through the resistor 46.

The cylindrical casing 10 of the motor is provided with downwardly extending side walls 58 and an end wall extension 59. A bottom plate 60 is secured to the said end wall 59 and to the bottom of the casing 10 at its forward end. Thus an auxiliary chamber is formed between the bottom plate 60 and the motor chamber, said chambers being separated by the lower wall 61 of the motor casing 10. The power unit is supported by an inclined arm 62 of a food mixer support, with the bottom plate 60 resting on said arm.

The auxiliary chamber houses the resistor 46 mounted on a support 46' in the walls 58, and houses the container 55 for the condensers 49, 52, which are shielded from each other, as indicated at 63 in Fig. 2, to avoid emanations from one condenser to the other and building up of an induced field from one to the other. The container 55 is fitted into the chamber, close to the source of interference, shielded from the motor by the wall 61 and protected by a fibre plate 64 against heat generated by the resistor 46. Protection against heat renders the condensers more effective for spark arresting and for preventing radio interference. The shielding of the dual condenser container 55 by means of the wall 61 and auxiliary casing makes the condensers much more efficient than they are when located within the motor chamber.

The condenser discharge is facilitated by the use of a screw 57, preferably made of brass, for grounding the discharge wire 56. An iron screw has a tendency to rust, particularly when used in connection with a die cast aluminum casing, and wire wound around such an iron screw would act as a choke and retard the discharge. A screw made of non-ferrous metal which does not rust, holds the ground wire firmly between the screw head and casing, and maintains a good contact, without any choking effect on the discharge. Examples of such non-ferrous metal of which the screw 57 may be made are brass, copper, nickel, silver, Monel metal and other similar types of metal.

Changes may be made in details of construction without departing from the scope of our invention and we do not intend to be limited to the exact form shown and described, except as set forth in the appended claims.

We claim:

1. An electrical motor comprising a casing providing a main chamber for housing the motor shaft and conventional motor parts, the casing walls being extended laterally and providing an auxiliary chamber separated from the main chamber by part of the casing wall, a condenser, and a container for the condenser located in said auxiliary chamber and shielded by said casing walls.

2. An electrical motor comprising a casing providing a main chamber for housing the motor shaft and conventional motor parts, the casing walls being extended laterally and providing an auxiliary chamber separated from the main chamber by part of the casing wall, a plurality of condensers, a container for said condensers located in said auxiliary chamber and shielded by said casing walls, and means in the container for shielding the condensers from each other.

3. An electrical motor comprising a casing providing a main chamber for housing the motor shaft and conventional motor parts, the casing walls being extended laterally and providing an auxiliary chamber separated from the main chamber by part of the casing wall, a condenser, a container for the condenser located in said auxiliary chamber and shielded by said casing walls, a ground wire extending from the condenser and container to the casing and a screw of non-ferrous metal connecting said wire to the casing.

4. An electrical motor comprising a casing providing a main chamber for housing the motor shaft and conventional motor parts, the casing walls being extended laterally and providing an auxiliary chamber separated from the main chamber by part of the casing wall, a plurality of condensers, a container for said condensers located in said auxiliary chamber and shielded by said casing walls, means in the container for shielding the condensers from each other, a ground wire extending from the condenser and container to the casing and a screw of non-ferrous metal connecting said wire to the casing.

5. An electric motor comprising a cylindrical casing, a motor shaft journalled in and extending longitudinally of the casing, the curved side walls of the cylindrical casing being extended laterally to form an auxiliary chamber separated from the main chamber by part of the casing wall, a condenser, and a container for the condenser located in said auxiliary chamber and shielded by said casing walls.

6. An electric motor comprising a cylindrical casing, a motor shaft journalled in and extending longitudinally of the casing, the curved side walls of the cylindrical casing being extended laterally to form an auxiliary chamber separated from the main chamber by part of the casing wall, a condenser, a container for the condenser located in said auxiliary chamber and shielded by said casing walls, a ground wire extending from the condenser and container to the casing and a screw of non-ferrous metal connecting said wire to the casing.

7. An electric motor comprising a casing, a motor shaft journalled in the casing, an armature and speed controlling means on the shaft, a condenser electrically connected with the speed controlling means, said condenser being located in the casing laterally of the armature, a container for the condenser, and a wall between the armature and condenser container adapted to shield the condenser.

8. An electric motor comprising a casing, a motor shaft journalled in the casing, an armature and speed controlling means on the shaft, a condenser electrically connected with the speed controlling means, said condenser being located in the casing laterally of the armature, a container for the condenser, a wall between the armature and condenser container adapted to shield the condenser, a resistor located between the condenser and the speed controlling means, and means between the condenser and resistor for shielding the condenser from heat generated by the resistor.

9. An electric motor comprising a casing, a motor shaft journalled in the casing, an armature and speed controlling means on the shaft, an electric circuit, a condenser electrically connected with the speed controlling means, said condenser being located in the casing laterally of the armature, a container for the condenser, a wall between the armature and condenser container adapted to shield the condenser, a filter condenser electrically connected to the supply wires of said circuit, a ground wire extending from the filter condenser and container to the casing and a screw of non-ferrous metal connecting said wire to the casing.

10. An electric motor comprising a casing, a motor shaft journalled in the casing, an armature and speed controlling means on the shaft, an electric circuit, a condenser electrically connected with the speed controlling means, said condenser being located in the casing laterally of the armature, a container for the condenser, a wall between the armature and condenser container adapted to shield the condenser, a resistor connected in parallel with the condenser in said circuit, means between the condenser and resistor for shielding the condenser from heat generated by the resistor, a filter condenser electrically connected to the supply wires of said circuit, a ground wire extending from the filter condenser and container to the casing and a screw of non-ferrous metal connecting said wire to the casing.

11. An electric motor comprising a casing, a motor shaft journalled in the casing, an armature on one end of the shaft, gearing in the casing for driving a tool, the opposite end of the motor shaft being operatively connected with said gearing, means on the motor shaft between said armature and said opposite end of the shaft for controlling the speed of the shaft, said controlling means including an electric circuit and automatically actuated breaker points in the circuit, an arc-suppressing condenser in the casing located laterally of the armature, a wall between the armature and condenser adapted to shield the condenser, and a resistor located between the condenser and said breaker points, the condenser being connected across said breaker points in said circuit.

12. An electric motor comprising a casing, a motor shaft journalled in the casing, an armature on one end of the shaft, gearing in the casing for driving a tool, the opposite end of the motor shaft being operatively connected with said gearing, means on the motor shaft between said armature and said opposite end of the shaft for controlling the speed of the shaft, said controlling means including an electric circuit and automatically actuated breaker points in the circuit, an arc-suppressing condenser in the casing located laterally of the armature, a wall between the armature and condenser adapted to shield the condenser, a resistor located between the condenser and said breaker points, and a heat resisting plate between the resistor and condenser container, the condenser being connected across said breaker points in said circuit.

13. An electric motor comprising a casing, a motor shaft journalled in the casing, an armature on one end of the shaft, gearing in the casing for driving a tool, the opposite end of the motor shaft being operatively connected with said gearing, means on the motor shaft between said armature and said opposite end of the shaft for controlling the speed of the shaft, said controlling means including an electric circuit and automatically actuated breaker points in the circuit, an arc-suppressing condenser in said circuit, located in the casing laterally of the armature, a wall between the armature and condenser adapted to shield the condenser, a resistor connected in parallel with the condenser in said circuit, a filter condenser electrically connected to the supply wires of said circuit, a ground wire extending from the filter condenser and container to the casing and a screw of non-ferrous metal connecting said wire to the casing.

14. An electric motor comprising a casing, a motor shaft journalled in the casing, an armature on one end of the shaft, gearing in the casing for driving a tool, the opposite end of the motor shaft being operatively connected with said gearing, means on the motor shaft between said armature and said opposite end of the shaft for controlling the speed of the shaft, said controlling means including an electric circuit and automatically actuated breaker points in the circuit, an arc-suppressing condenser in said circuit, located in the casing laterally of the armature, a wall between the armature and condenser adapted to shield the condenser, a resistor connected in parallel with the condenser in said circuit, a heat resisting plate between the resistor and condenser container, a filter condenser electrically connected to the supply wires of said circuit, a ground wire extending from the filter condenser and container to the casing and a screw of non-ferrous metal connecting said wire to the casing.

15. An electric motor comprising a casing, a motor shaft journalled in the casing, an armature on one end of the shaft, gearing in the casing for driving a tool, the opposite end of the motor shaft being operatively connected with said gearing, means on the motor shaft between said armature and said opposite end of the shaft for controlling the speed of the shaft, said controlling means including an electric circuit and automatically actuated breaker points in the circuit, an arc-suppressing condenser in the casing located laterally of the armature, a wall between the armature and condenser adapted to shield the condenser, and a resistor located between the condenser and said breaker points, the condenser being connected across said breaker points in said circuit by crossed wires.

16. An electrical motor comprising a casing, a motor shaft journalled in the casing, an armature and speed controlling means on the shaft, an electrical circuit in which said speed controlling means is connected, an arc suppressing condenser connected across the speed controlling means in said circuit, a filter condenser connected to the lead wires of said circuit, a ground connection for said filter condenser, and means for shielding said condensers.

17. An electrical motor comprising a casing, a motor shaft journalled in the casing, an armature and speed controlling means on the shaft, an electrical circuit in which said speed controlling means is connected, an arc suppressing condenser connected across the speed controlling means in said circuit, a filter condenser connected to the lead wires of said circuit, a ground connection for said filter condenser, and means for shielding said condensers from the armature and from each other.

18. An electrical motor comprising a casing, a motor shaft journalled in the casing, an armature and speed controlling means on the shaft, an electrical circuit in which said speed controlling means is connected, an arc suppressing condenser connected across the speed controlling means in said circuit by crossed wires, a filter condenser connected to the lead wires of said circuit, a ground connection for said filter condenser, and means for shielding said condensers.

19. An electrical motor comprising a casing, a motor shaft journalled in the casing, an armature and speed controlling means on the shaft, an electrical circuit in which said speed controlling means is connected, an arc suppressing condenser connected across the speed controlling means in said circuit, a resistor connected in parallel with the condenser in said circuit, and means for shielding said condenser.

EMANUEL NIELSEN.
VICTOR A. PARTZ.